US010646880B2

(12) United States Patent
Gaudreault

(10) Patent No.: US 10,646,880 B2
(45) Date of Patent: May 12, 2020

(54) CUTTING TOOTH SPLITTER APPARATUS AND METHOD

(71) Applicant: Daniel Gaudreault, Summerville, SC (US)

(72) Inventor: Daniel Gaudreault, Summerville, SC (US)

( * ) Notice: Subject to any disclaimer, the term of this patent is extended or adjusted under 35 U.S.C. 154(b) by 1196 days.

(21) Appl. No.: 14/883,725

(22) Filed: Oct. 15, 2015

(65) Prior Publication Data

US 2017/0106375 A1 Apr. 20, 2017

(51) Int. Cl.
*B02C 18/18* (2006.01)
*A01G 23/00* (2006.01)

(52) U.S. Cl.
CPC .............. *B02C 18/18* (2013.01); *A01G 23/00* (2013.01)

(58) Field of Classification Search
CPC ... B02C 18/18; B02C 18/226; B02C 18/2266; A01G 23/00; B27G 13/00; B27G 13/04; B27G 13/06; B27G 13/08; B27G 13/10; B27G 13/02; B27G 13/002
See application file for complete search history.

(56) References Cited

U.S. PATENT DOCUMENTS

| | | | |
|---|---|---|---|
| 6,138,725 A | 10/2000 | Leonardi et al. | |
| 6,176,445 B1 | 1/2001 | Shinn | |
| 6,523,768 B2 | 2/2003 | Recker et al. | |
| 6,764,035 B2 | 7/2004 | Denis et al. | |
| 7,380,576 B2 | 6/2008 | Pizzuto | |
| 7,487,931 B2 * | 2/2009 | Monyak | B02C 13/2804 241/197 |
| 7,578,462 B2 | 8/2009 | Edwards | |
| 7,810,531 B2 | 10/2010 | Labbe | |
| 7,850,107 B2 | 12/2010 | Schafer | |
| 7,967,044 B2 | 6/2011 | Labbe et al. | |
| 8,231,072 B2 | 7/2012 | Willibald | |
| 8,540,033 B2 | 9/2013 | Stanley et al. | |
| 8,672,001 B2 | 3/2014 | Leonardi et al. | |
| 8,844,853 B2 * | 9/2014 | Hongo | B02C 13/2804 241/294 |
| 8,893,997 B2 | 11/2014 | Gaudreault | |
| 2014/0261889 A1 | 9/2014 | Labbe | |
| 2015/0078843 A1 * | 3/2015 | Diego | B02C 18/18 407/103 |

* cited by examiner

Primary Examiner — Faye Francis
(74) Attorney, Agent, or Firm — Southeast IP Group, LLC; Todd L. Moses

(57) ABSTRACT

A splitter is provided for mounting on the leading face of a cutting assembly to be mounted on a brush cutter. In one embodiment, the splitter is preferably mounted below the cutting portion of the tooth such that as wood is cut, the cut wood is directed onto the splitter for further cutting. The tooth is mounted to cut tangentially with respect to the rotation of the cutter, while the splitter cuts radially and outwardly with respect to the rotation of the cutter. In this manner, a cutting mechanism is provided that is capable of cutting tangentially and radially simultaneously. The flow of cut wood is directed out of from the cutting assembly, thus facilitating the removal of the cutting debris away from the tooth holder and the cutting tooth, thereby cleaning the tooth of any debris and preventing wood and other debris from getting lodged within the cutting assembly.

9 Claims, 9 Drawing Sheets

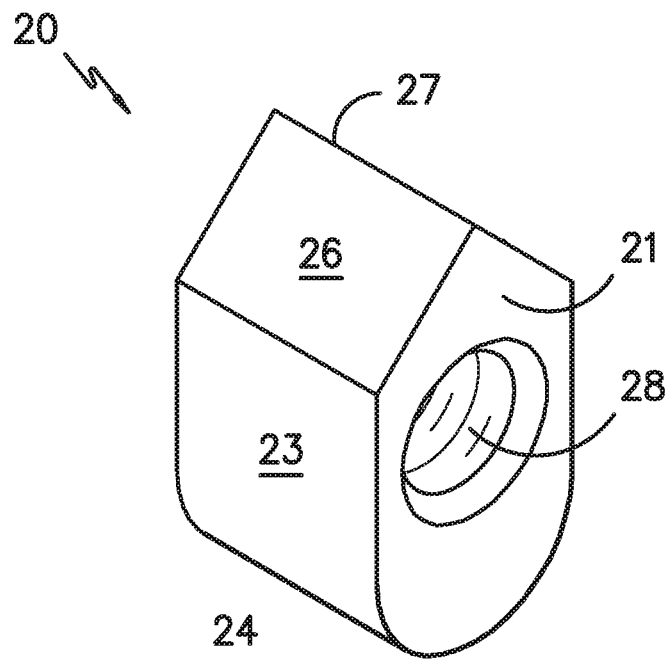
FIG. -1-
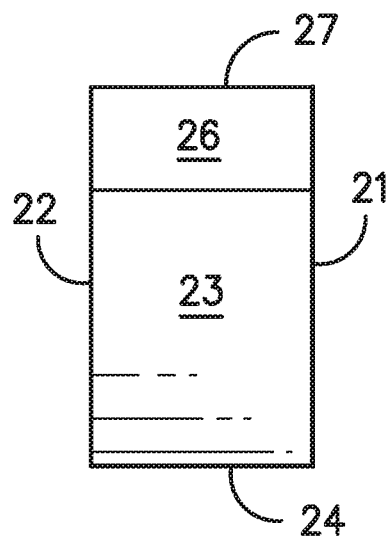
FIG. -2-
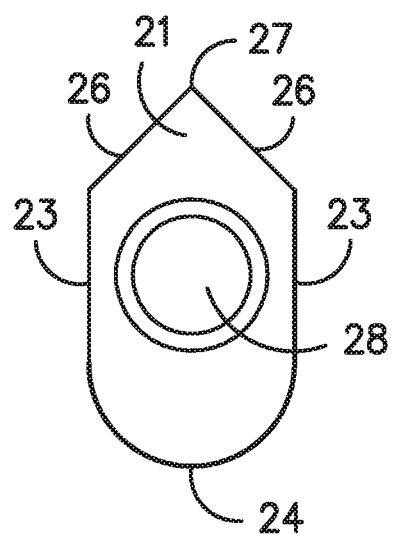
FIG. -3-

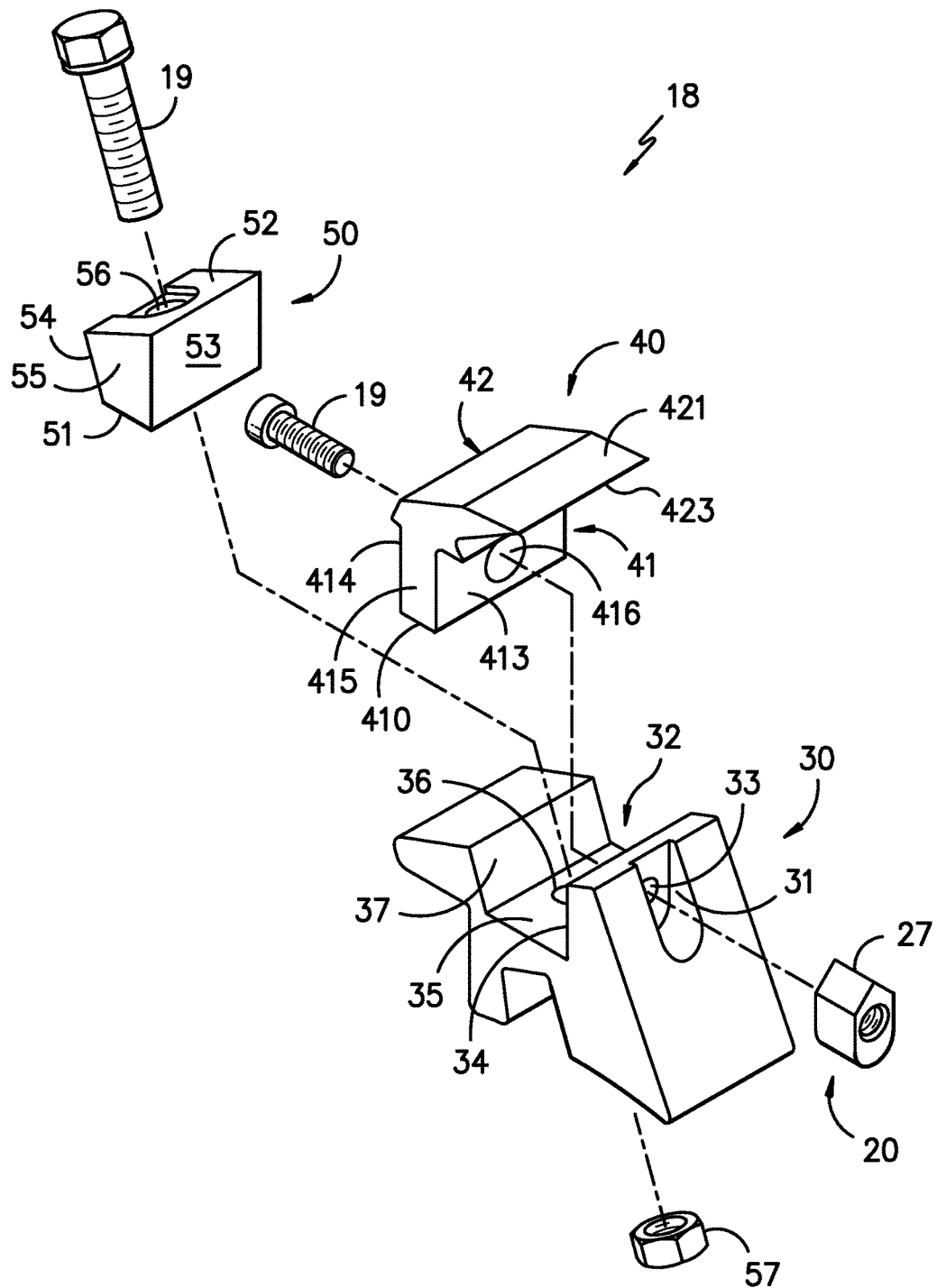
FIG. -4-

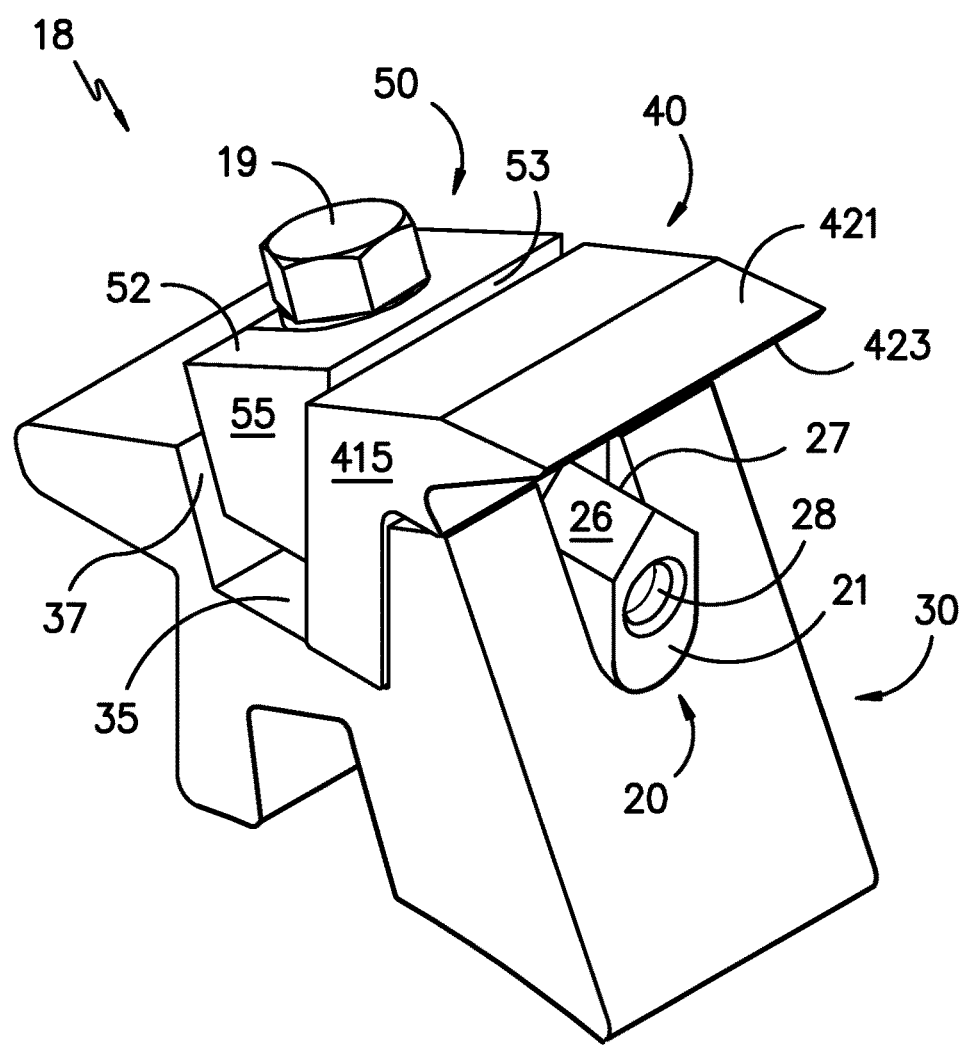
FIG. -5-

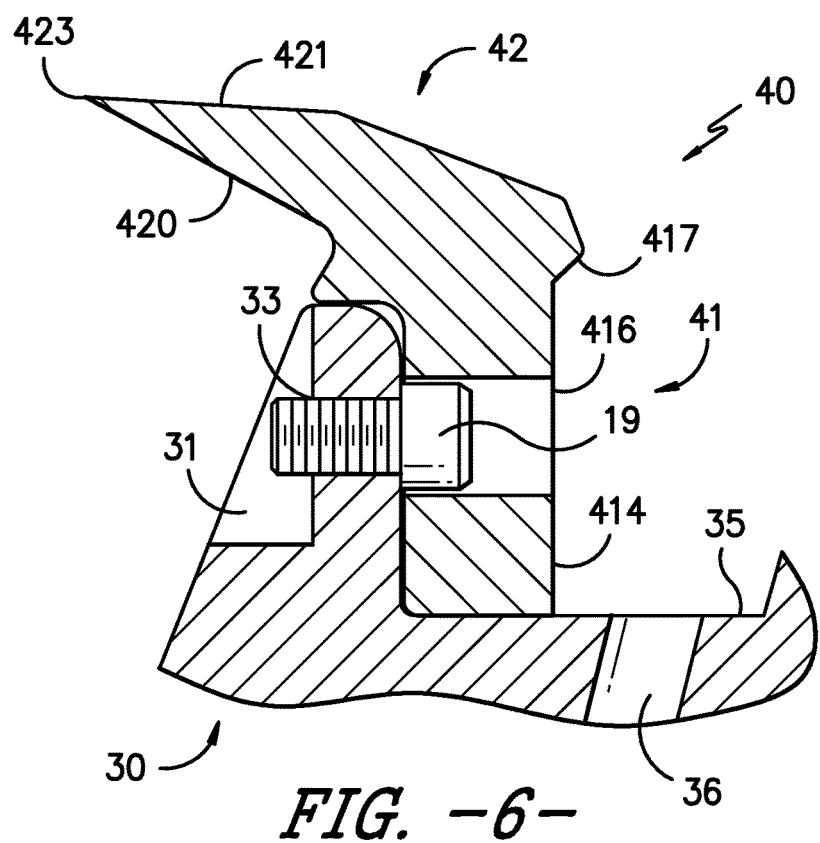
FIG. -6-
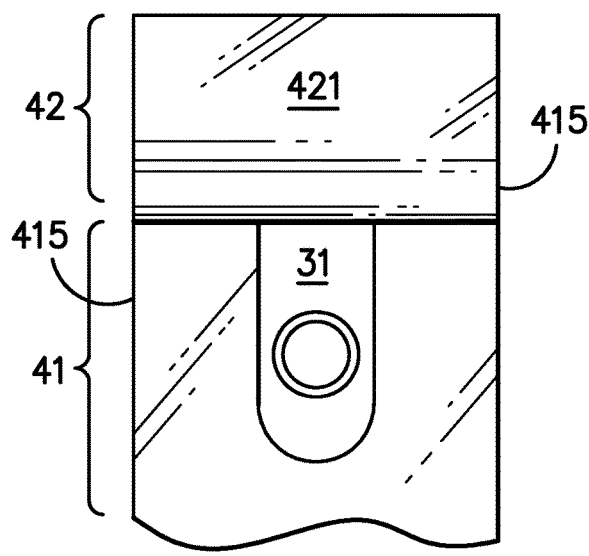
FIG. -7-

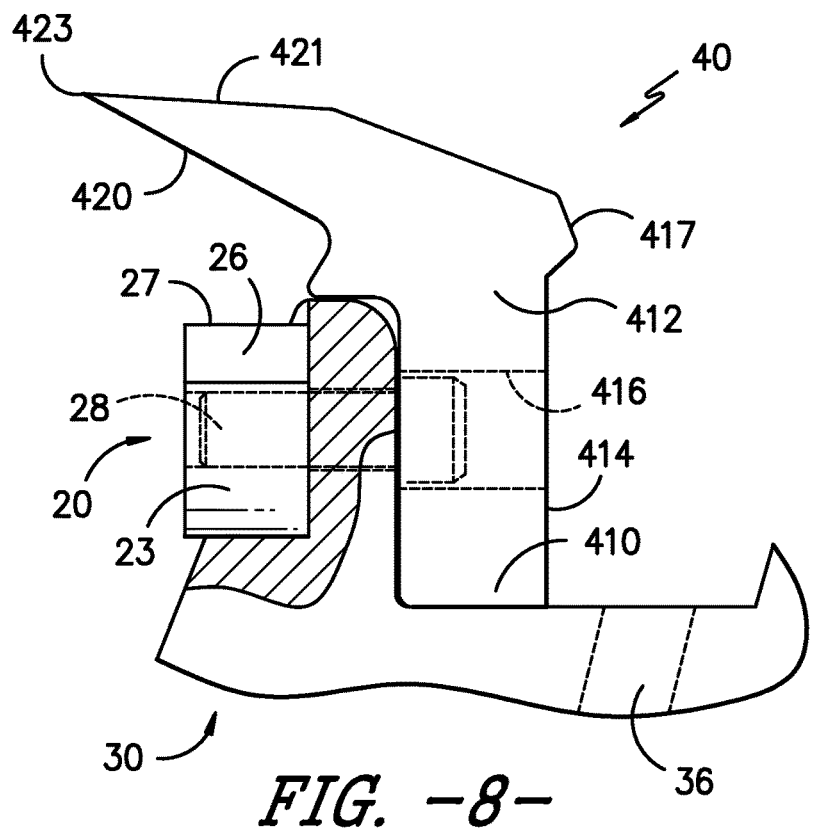
FIG. -8-
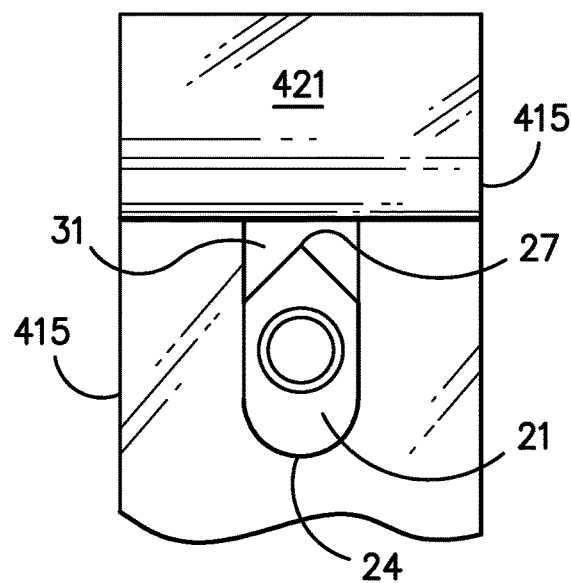
FIG. -9-

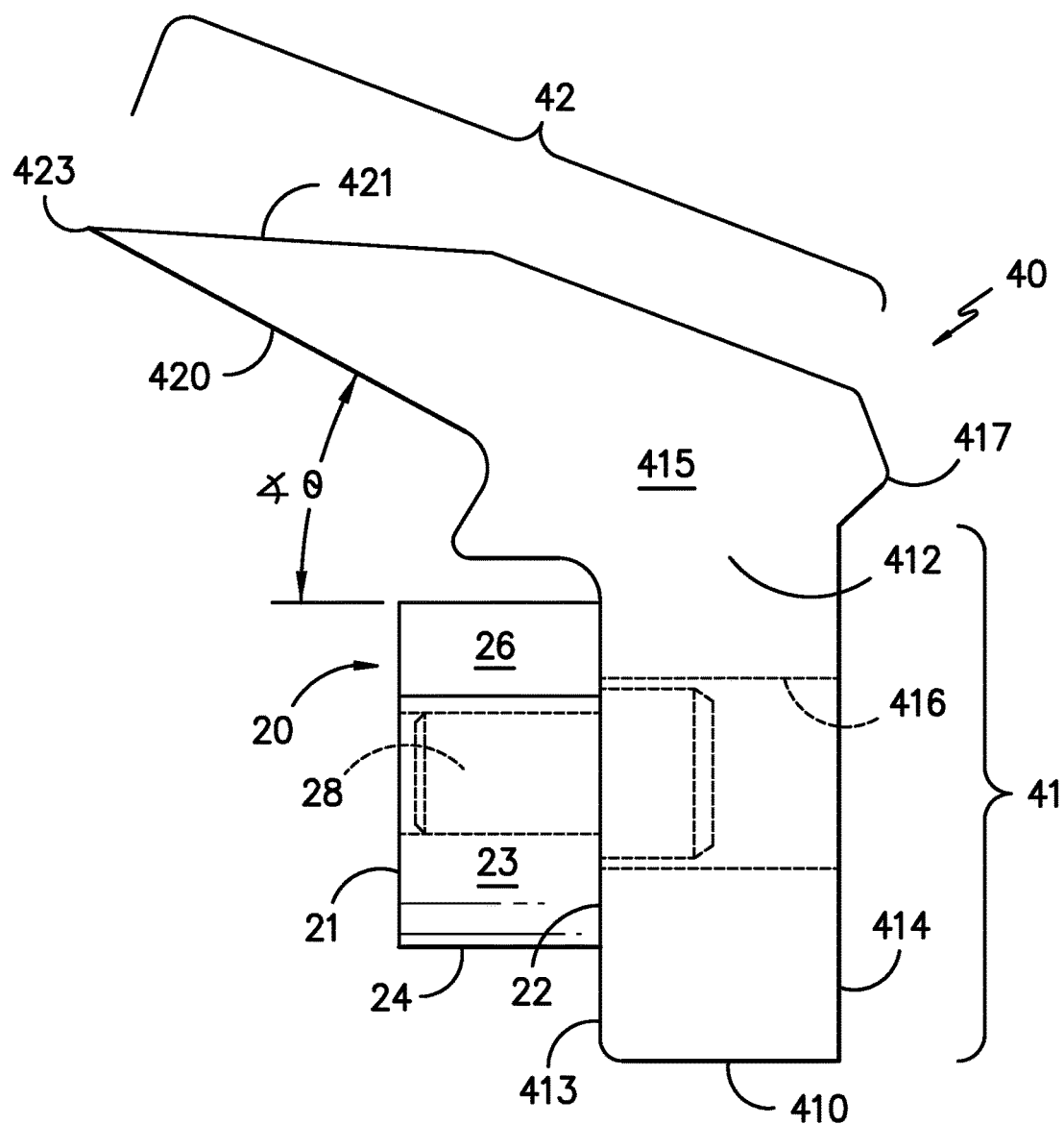
FIG. -10-

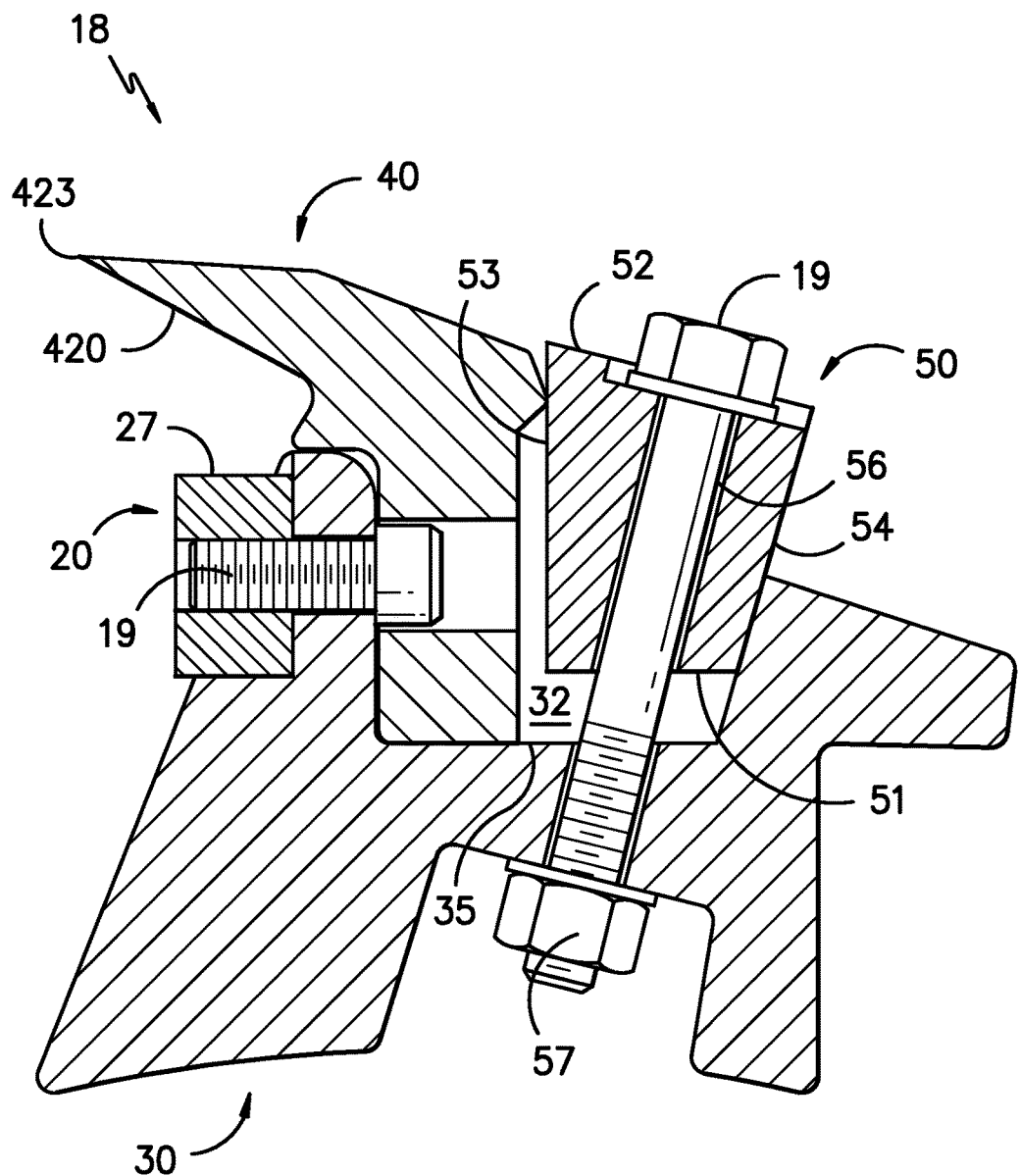
FIG. -11a-

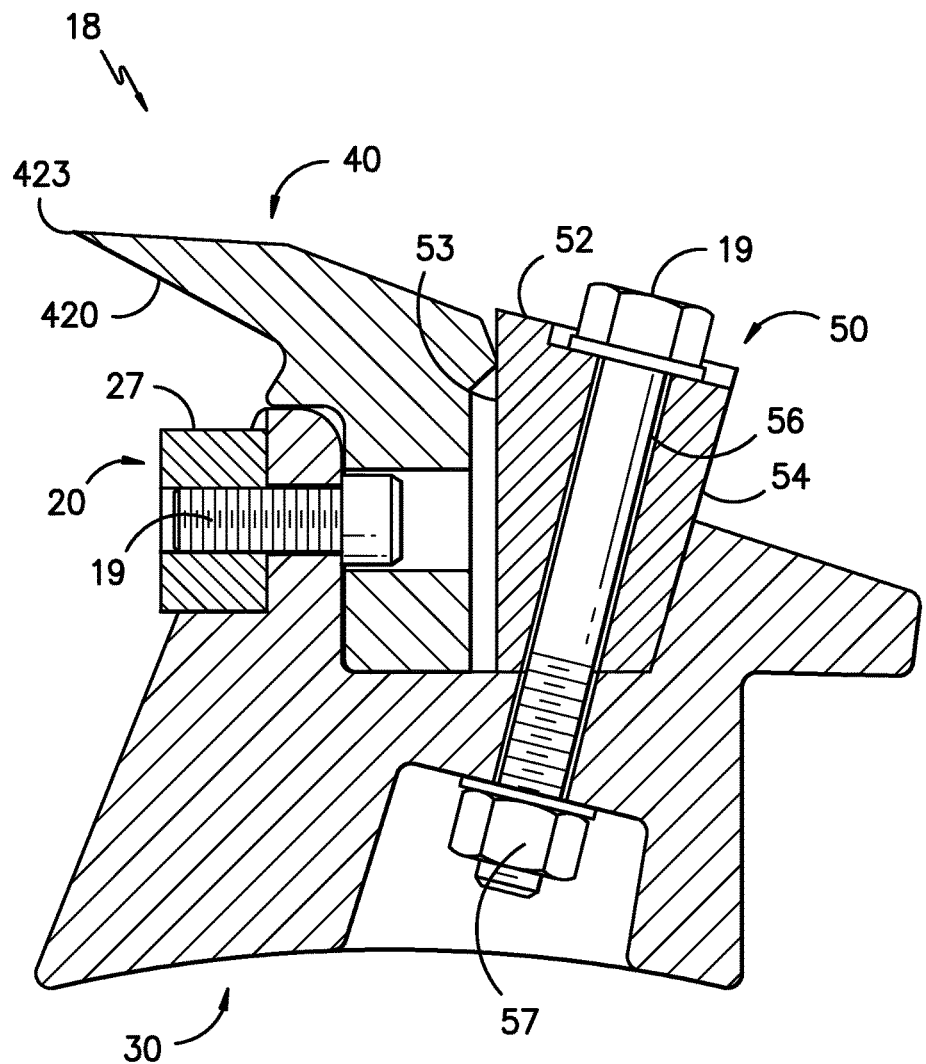
FIG. -11b-

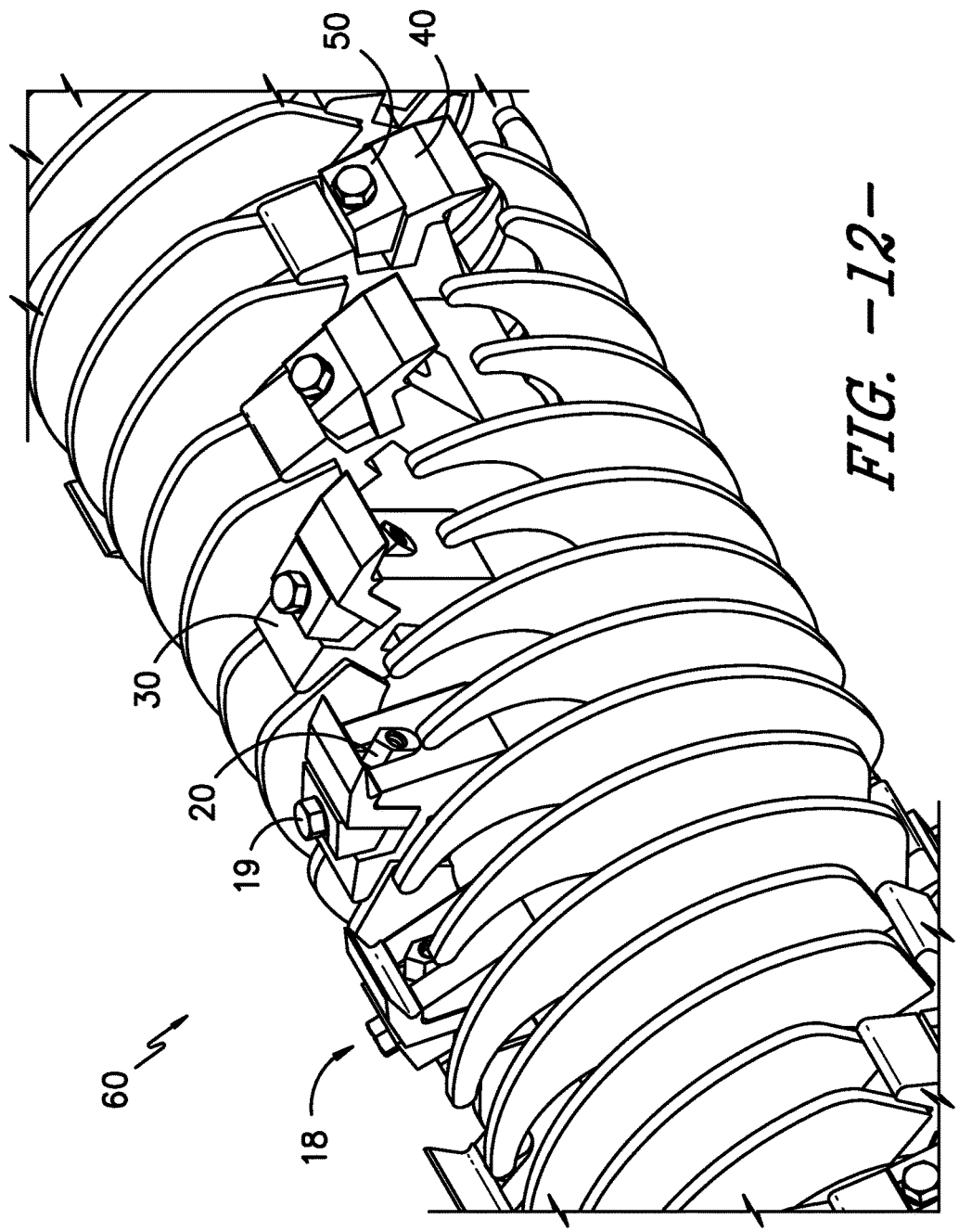
FIG. -12-

CUTTING TOOTH SPLITTER APPARATUS AND METHOD

BACKGROUND OF THE INVENTION

Extensive felling and mulching operations are often performed with a heavy-duty brush cutter mounted to the front of a self-propelled vehicle. A typical brush cutter includes a brush cutting head with a cylindrical support body, or drum, and a plurality of mounting blocks welded or fastened to the outer surface of the support body. Cutting teeth are mounted on the front leading face of each mounting block, typically through the use of a nut and bolt combination. High velocity rotation of the drum causes the cutting elements to shred wood, debris and the like.

Mounting blocks for the cutting teeth on cutting heads are also often fixedly mounted on the surface of the cylindrical support head in an exposed position. An example is shown in U.S. Pat. No. 5,873,534. These mounting blocks, and/or the teeth fixedly mounted on them, often hit rocks or large trees and are damaged or even broken off. Replacement of these mounting blocks is difficult and expensive. Over relatively short periods of use, one or more of the teeth typically break off, while others soon become too worn for effective cutting and mulching. Breakage of a single tooth during operation of the cutting head can cause substantial damage to the cutting head and presents a considerable safety hazard to nearby workers.

Protective means may be provided in front of each mounting block to prevent the blocks from directly striking rocks or large trees during operation of the cutting head. Thus the blocks are not subjected to sudden large forces which could result in serious damage. Examples include protective collars encircling the cylindrical support base. These collars typically stop just short of the mounting block in order to provide a clearance space, while the opposing end of the collar may be welded to the back face of the associated mounting block.

One such brush cutting head is described in U.S. Pat. No. 6,764,035. This patent discloses a brush cutting head that has a cylindrical support base and a plurality of cutting tooth mounting blocks fastened to the outer surface of the base. The bottom surface of each mounting block is concavely curved to match the radius of the base thereby allowing each mounting block to be welded onto the base with its bottom surface flush with the outer surface of the base. Each mounting block carries a cutting tooth on its front face. To protect the mounting blocks from rocks, each mounting block is provided with a protective collar. Each protective collar is welded to the outer surface of the base and extends radially therefrom, transverse to the longitudinal axis of the base. Each collar terminates circumferentially a short distance from the front face of the mounting block with which it is associated to provide a front clearance space. The opposed end of the collar is welded to the back face of the associated mounting block to strengthen it.

While the protective collars described in U.S. Pat. No. 6,764,035 afford the cutting tooth assemblies some protection, the cutting teeth remain nonetheless exposed to violent impact with hard objects, like stones, and thus are still vulnerable to damage during brush cutting operations.

Another example of one such brush cutting head is described in United States Patent Publication No. 2010/0044487. This published patent application discloses a brush cutter that has a cylindrical support base and a plurality of mounting blocks fastened to the outer surface of the base. The bottom surface of each mounting block is concavely curved to match the radius of the base thereby allowing each mounting block to be welded onto the base with its bottom surface flush with the outer surface of the base. Each mounting block has a front face which is recessed from the front end of the mounting block so as to define a horizontal shelf near the bottom surface of the mounting block. Each mounting block carries a cutting tooth on its front or leading face. The cutting tooth is fastened to the mounting block by a nut and bolt combination, the bolt being inserted through a smooth bore defined in the mounting block.

However, the design of the cutting tooth for this brush cutting head tends to suffer from certain disadvantages. Manufacture of the guide members projecting from the base portions of the cutting tooth must be precise and can be time consuming. Moreover, certain problems have been encountered when replacing old, broken or worn cutting teeth on the brush cutting head. In some cases, it has been found that the guide members projecting from the base portions of replacement cutting teeth do not always line up with the fittings on the mounting block into which they are to be received. As a result of this misalignment, some cutting teeth could not be properly secured to the mounting blocks, thereby causing delay, excessive warranty claims and requiring operators to carry on hand a greater number of replacement cutting teeth than would ordinarily be required.

United States Patent Application Publication No. 2007/0261763 describes a brush cutting head provided with differently configured collars and cutting tooth assemblies. This brush cutting head has a cylindrical support body with a curved outer surface and a plurality of penannular collars. The collars are mounted to the support body at spaced apart locations and extend radially from its curved outer surface. Each collar cooperates with an adjacent collar to define a mounting station between adjacent collars. A plurality of cutting tooth assemblies are carried on the outer surface of the support body. Each cutting tooth assembly has a cutting tooth for placement within a mounting station, and a mounting assembly engageable with the adjacent collars to secure the cutting tooth in the mounting station.

By having the cutting tooth and its associated mounting assembly disposed between adjacent collars, two-fold protection is afforded to the cutting teeth. The collars shield the cutting teeth from rocks and other hard objects and reduce the stresses to which the cutting teeth are subjected during operations by improving the distribution of forces through the mounting assembly.

While the brush cutting head described in United States Patent Application Publication No. 2007/0261763 has proven itself successful on the field and constitutes an improvement over what was previously available on the market, efforts continue to be made to lengthen the service life of the cutting teeth and their mounting assemblies by reducing the incidence of destructive impact with rocks.

Additional cutting heads are described in U.S. Pat. No. 7,810,531, and U.S. Patent Publication No. 2013/0099039; all of the aforementioned patents and publications being incorporated herein by reference. The cutting teeth on brush cutters are often designed and mounted on the mounting blocks on the cutting head to cut in a tangential direction when the cylindrical support head is rotated. As a result, the mounting blocks are subject to high shear forces. The blocks must be quite large to resist these forces and this adds weight to the cutting head increasing power requirements. The teeth employed are also usually quite complicated in construction and are quite costly to replace when broken or damaged.

Furthermore, as the cutting head rotates to cut through wood and the like, wood chips and debris tend to build up underneath the cutting teeth and in-between the mounting block and protective collars, causing detrimental effects to both the cutting assembly and cutting performance. This build-up of wood debris decreases cutting efficiency of the cutting head, thus requiring more energy to perform the cutting process. Additionally, the effectiveness of each cut is decreased due to wood build-up underneath the cutting portion of the teeth. As wood is impacted and pushed against the cutting assembly, components of the assembly become blunted and worn-down over time.

In light of the foregoing, it would be advantageous to provide a cutting head, specifically cutting teeth, which exhibit improved wear resistance characteristics. In particular, teeth which do not require frequent sharpening, repair or replacement would be most desirable. It would be further advantageous to provide a self-cleaning cutting assembly that cuts and cleans the teeth concurrently or sequentially, thus preventing the build-up of debris along the cutting head.

BRIEF SUMMARY OF THE INVENTION

The present invention generally relates to a cutting tooth, more specifically a splitter apparatus that may be mounted on a cutting tooth, for use on a cutting head, as well as a method for utilizing such an apparatus.

In one aspect of the present invention, a cutting tooth is provided that performs a two-step cut, whereby a first bite of wood is taken, and that first bite is cut again a second time as the teeth are cleaned of any debris.

In another aspect of the present invention, a splitter apparatus is provided that can be mounted on a cutting assembly for use on a brush cutter. This splitter apparatus is designed to be mounted on any new or pre-existing cutting teeth.

In one embodiment, the splitter may be generally oblong shaped preferably with a curved or rounded bottom, two flat faces opposing one another, and a wedge-shaped top with two sides coming together to form a splitting edge. The splitter is preferably mounted below the cutting portion of the tooth such that as the tooth cuts the wood, the cut wood is directed onto the splitter for further cutting. The tooth is mounted to cut tangentially with respect to the rotation of the cutter, while the splitter cuts radially and outwardly with respect to the rotation of the cutter. In this manner, a cutting mechanism is provided that is capable of cutting tangentially and radially simultaneously. The flow of cut wood is directed out of from the cutting assembly, thus facilitating the removal of the cutting debris away from the tooth holder and the cutting tooth, and thereby cleaning the tooth of any debris and preventing wood and other debris from getting lodged within the cutting assembly.

DESCRIPTION OF THE DRAWINGS

These and other features, aspects, and advantages of the present invention will become better understood with regard to the following description, appended claims, and accompanying drawings where:

FIG. 1 is a perspective view of an embodiment of a cutting tooth splitter;

FIG. 2 is a side view of an embodiment of a cutting tooth splitter;

FIG. 3 is a front view of an embodiment of a cutting tooth splitter;

FIG. 4 is an exploded view illustrating how an embodiment of a cutting tooth splitter may be attached to one embodiment of a cutting assembly;

FIG. 5 is a perspective view of one embodiment of a cutting assembly including a splitter mounted to the tooth holder;

FIG. 6 is a cross-sectional side view of a cutting tooth mounted in a tooth holder, without the addition of a splitter;

FIG. 7 is a front view of a cutting tooth mounted in a tooth holder, without the addition of a splitter;

FIG. 8 is a cross-sectional side view of an embodiment of a splitter mounted to a tooth holder and mounting block;

FIG. 9 is a front view of an embodiment of a splitter mounted to a cutting tooth and tooth holder;

FIG. 10 is a side view of an embodiment of a splitter mounted to a cutting tooth;

FIG. 11a is a cross-sectional side view of one embodiment of a cutting tooth assembly including the addition of a splitter;

FIG. 11b is a cross-sectional side view of an alternative embodiment of a cutting tooth assembly including the addition of a splitter; and FIG. 12 is a perspective view of one embodiment of a brush cutting head whereby the cutting teeth include a splitter mounted thereon.

DETAILED DESCRIPTION OF THE INVENTION

In one embodiment, the splitter 20 may be generally oblong shaped preferably with a curved or rounded bottom 24, two flat faces 23 opposing one another, and a wedge-shaped top with two sides 26 coming together to form a splitting edge 27. FIGS. 1-3 illustrate a preferred embodiment of a splitter 20 of the present invention. More specifically, referring to FIGS. 1 and 3, the splitter 20 has a leading face 21 and an opposed trailing face 22; two lateral faces 23, spaced apart; a generally curved bottom 24; and, two splitting faces 26 (a first and a second) extending at an angle from a second end of each lateral face 23, coming together to form a cutting edge 27, also referred to herein as a splitting edge. Referring in more detail to FIG. 3, the curved bottom 24 generally forms a semi-circle with the lateral faces 23 or sides extending upward such that the lower or mounting portion of the splitter 20 is generally U-shaped. The upper or cutting portion of the splitter 20 comprises a first and second splitting face 26 extending at an angle and coming together to generally form a wedge shape, thereby forming a cutting edge 27. A threaded bore 28 extends through the splitter from the leading face 21 to the trailing face 22, generally centered therethrough. This threaded bore 28 is for receiving a fastener 19 so that the splitter 20 may be removabley mounted to a mounting block 30 and/or a cutting tooth 40. It is to be noted that the size of the splitter 20 may be scaled larger or smaller to accommodate different sizes of cutting assemblies and various types of brush cutters.

FIGS. 4, 5, 10a, and 10b illustrate examples of a cutting tooth assembly 18 and how a splitter 20 may be mounted thereto. It is to be noted that these figures and accompanying descriptions are meant to provide context in which the splitter 20 may be used and assembled on a cutting head, and are not limiting the present invention to these particular embodiments or assemblies. In a general overview of the assembly, the splitter 20 is fitted into an indention or chamber 31 on the front leading face of the tooth holder 30 and fastened in place with a fastener 19. The tooth 40 is then inserted into a mounting recess 32 within the tooth holder 30 and centered over the head of the fastener 19, holding the tooth 40 in place. A wedge block 50 is then inserted behind the tooth 40, adjacent the rear end of the tooth holder 30 and secured in place with a bolt 19 and nut 57. The mounting position of the tooth 40 and splitter 20 relative to one another provides a cutting assembly 18 in which a tooth cutting edge 423 cuts tangentially with respect to the rotation of the cutting head 60, while the splitting edge 27 of the splitter 20 cuts or splits radially with respect to the rotation of the cutting head 60.

The cutting tooth assembly 18 and exemplary components are now explained in further detail. FIG. 4 shows an exploded view of an exemplary embodiment of an assembly 18 including a tooth holder 30, a cutting tooth 40, a wedge block 50, a splitter 20, and requisite fasteners 19, 57. In one embodiment, the tooth holder 30 includes a chamber 31 on a front face and a central recess 32 or cavity for receiving and mounting the cutting tooth 40. The chamber 31 has a first bore 33 extending therethough to the mounting recess 32 and a curved or concave bottom generally corresponding to the rounded bottom 24 of the splitter 20. The recess 32 has a forward mounting surface 34 for mounting the tooth 40, a bottom supporting surface 35 defining a second threaded bore 36, and a rear surface 37 abutting the wedge block 50 once assembled. In a typical prior art assembly, the cutting tooth 40 is inserted and fastened into the recess 32 of the tooth holder 30 with a bolt 19 secured by a nut. The present invention is designed such that the splitter 20 may be used in place of the nut, allowing the splitter 20 to be retro-fitted to pre-existing cutting teeth or incorporated in the design of new assemblies. In FIG. 4, the splitter 20 may be inserted into the chamber 31 on the front of the tooth holder 30, such that the leading face 21 of the splitter 20 is facing outward and the trailing face 22 is abutting the wall of the chamber 31 with the threaded bore 28 of the splitter 20 aligned with the first bore 33 of the chamber 31. The splitter 20 may then be fastened or secured within the chamber 31 through the use of the same fastener 19 that is used to fasten the tooth 40.

The cutting tooth 40 has a base portion 41 having a first end 410 and a second end 412, and a cutting portion 42 mounted to the second end of the base portion. The base portion 41 is generally planar, having a leading face 413, an opposing trailing face 414 and two, spaced apart, lateral faces 415. Defined in the base portion 41 is a bore 416 that extends between the leading face 413 and the trailing face 414. The bore 416 is adapted to receive a fastener 19 therethrough to permit fastening of the cutting tooth 40 to the mounting assembly 18. Adjacent the second end 412, the trailing face 414 of the base portion 41 flares outwardly to partially define a wedge-shaped abutment shoulder 417. The abutment shoulder 417 serves to reinforce the cutting tooth 40 and enables it to better resist the high impact forces to which it may be subjected during operation of the brush cutting head 60. As a result, the cutting tooth 40 tends to be less vulnerable to cracking failures along the area where the cutting portion 42 meets the base portion 41.

The tooth 40 is inserted into the tooth holder 30 with the leading face 413 of the tooth 40 facing the mounting surface 34 of the mounting recess 32, such that the bore 416 of the tooth base portion 41 is aligned with and slid forward over the head of the bolt 19. The leading face 413 of the tooth 40 abuts the mounting surface 34 of the recess 32, and the head of the bolt 19 is contained within the bore 416 of the tooth 40, preferably flush with the back trailing surface 414 of the tooth 40 (as shown in FIGS. 11a and 11b).

The wedge block 50, also having a first end 51, a second end 52, a leading face 53, a trailing face 54, and two lateral faces 55, is inserted in the mounting recess 32 behind the tooth 40, such that the leading face 53 of the wedge block 50 abuts the trailing face 54 of the tooth 40, and the trailing face 54 of the wedge block 50 abuts the rear surface 37 of the mounting recess 32, as shown in FIG. 5. The body of the wedge block 50 defines a threaded bore 56 for fastening the wedge block 50 into the tooth holder 30, this threaded bore 56 being aligned with the second bore 36 of the mounting recess 32. As shown in FIGS. 11a and 11b, the wedge block 50 may be secured by a fastener 19 inserted through the second end 52 of the wedge block 50 and secured with a nut 57 located underneath the tooth holder 30 in the generally concave bottom surface of the tooth holder 30 which engages the outer peripheral surface of the drum 60.

Referring specifically now to the cutting aspect of the tooth assembly 18, in a preferred embodiment, the splitter 20 is mounted below the cutting portion 42 of the tooth 40 such that an acute angle θ is formed between the leading face 420 of the cutting portion 42 of the tooth 40 and the cutting edge 27 of the splitter 20, as shown in FIG. 10. The leading face 420 of the cutting portion 42 of the tooth 40 is preferably angled such that as the tooth 40 cuts the wood, the cut wood is directed toward and onto the splitter 20. As the brush cutter rotates forward, the tooth 40 cuts tangentially with respect to the rotation of the cutter, while the splitter 20 cuts radially and outwardly with respect to the rotation of the cutter. In this manner, the cutting mechanism of the brush cutter is designed to cut tangentially and radially simultaneously. Simply put, as the drum 60 rotates and the tooth 40 cuts tangentially in a forward and downward motion, the cutting edge 27 of the splitter 20 cuts in a radial and outward motion. As the tooth 40 takes the first cut, the leading face 420 of the tooth 40 drives that initial bite of wood down onto the splitting edge 27 of the splitter 20 for further cutting. The splitter 20 further cuts the wood and directs the flow of wood away from the cutting assembly 18, thus facilitating the removal of the cutting debris away from the tooth holder 30 and the cutting tooth 40, thereby cleaning the tooth 40 of any debris and preventing wood and other debris from getting lodged within the cutting assembly 18.

The position of the cutting edge 27 of the splitter 20 in relation to the cutting edge 423 of the tooth 40 is now described in greater detail with reference to FIGS. 8-10. In one embodiment, the cutting portion 42 of the tooth 40 is carried on the second end 412 of the base portion 41 in a generally, forwardly leaning or canted fashion, and is integrally formed with the base portion 41. The cutting portion 42 has a leading face 420, an opposed trailing face 421 and two spaced-apart lateral faces 415. The leading face 420 of the cutting portion 42 joins the leading face 413 of the base portion 41, while the trailing face 421 of the cutting portion 42 joins the trailing face 414 of the base portion 41. The leading 420 and trailing faces 421 of the cutting portion 42 cooperate with each other to define a tapering, wedge-like, profile that terminates in a cutting edge 423. The cutting edge 423 extends generally linearly between the lateral faces 415 of the tooth 40 and is carried forwardly of the leading face 413 of the base portion 41 such that it tends to be the first element of cutting tooth 40 to make contact with the brush. However, in alternative embodiments, the cutting edge 423 could be configured differently. For instance, the cutting edge 423 could be configured to extend generally diagonally between the lateral faces 415 and askew of the rotational axis. This configuration would tend to favor one end of the cutting edge 423 over the other contacting the brush. In a further alternative, the cutting edge 423 could be scalloped or formed to extend in a generally, zigzagging fashion.

In one embodiment, illustrated by FIG. 12, the cutting assembly 18 is mounted on the drum 60 such that a first cutting edge is provided on a distal portion thereof, and a second cutting edge is provided between the drum and the first cutting edge. More specifically, a first cutting edge provided by the tooth 40 lies in a first plane, with the first cutting edge rotating and cutting tangentially with rotation of the support body 60. In this same embodiment, a second cutting edge provided by the splitter 20 lies in a second plane, positioned between the drum 60 and the cutting edge 423 of the tooth 40. The cutting edge 27 of the splitter 20 extends generally linearly between the leading 21 and trailing faces 22 of the splitter 20, with the second cutting edge cutting radially and outwardly with rotation of the drum 60. This addition of a second cutting edge, arranged in this preferred manner, provides a controlled two-step cutting process, whereby the first cutting edge makes an initial cut of wood, while the second cutting edge makes a second cut radially to the first, thereby cutting and cleaning the tooth 40 simultaneously while directing the debris out of and away from the cutting assembly 18.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A cutting assembly comprising;
   a rotating cutting head;
   at least one tooth holder affixed to said rotating cutting head;
   a cutting tooth removably attached to said tooth holder, said cutting tooth including a leading face and a trailing face that intersect to form a single linear cutting edge;
   a splitter removably attached said tooth holder adjacent said leading face of said tooth, said splitter comprising a body adapted for mounting on a tooth holder, said body having two sides extending at an angle and coming together to form a single linear splitting edge oriented tangentially with respect to said rotating cutting head so that said splitting edge is directed radially away from said cutting head, and further including a threaded bore extending through said body and adapted for receiving a fastener for removable attachment of said splitter to said tooth holder.

2. The splitter of claim 1, wherein said tooth holder is removably affixed to said rotating cutting head.

3. The splitter of claim 1,
   wherein said cutting edge of said cutting tooth is positioned to cut tangentially with respect to said rotatable cutting head when said cutting head is rotated.

4. A splitter for a cutting assembly comprising:
   a body having a mounting portion and a cutting portion;
   said body having a leading face and an opposed trailing face;
   said mounting portion having a first lateral face, a second lateral face, and a generally curved, U-shaped convex bottom;
   said cutting portion having a first splitting face extending at an angle from an upper end of said first lateral face and a second splitting face extending at an angle from an upper end of said second lateral face, whereby said first and second splitting faces come together to form a splitting edge; and
   said body defining a threaded bore for receiving a fastener, said bore extending from said leading face to said trailing face and being generally centered therethrough.

5. The splitter of claim 4, further including:
   a tooth mounted on a surface of a cylindrically shaped rotatable drum, wherein said tooth includes a cutting edge on a distal portion thereof;
   said splitter being removably mounted to a leading face of said tooth so that said splitting edge is disposed between said rotatable drum and said cutting edge of said tooth; and
   wherein said cutting edge is disposed to cut tangentially with respect to said cylindrically shaped surface of said rotatable drum, and said splitting edge is disposed to cut radially with respect to said cylindrically shaped surface of said rotatable drum.

6. A cutting apparatus comprising a cutting assembly mounted on a surface of a generally cylindrical rotatable body, said assembly comprising a first cutting edge and a second cutting edge disposed in relation to one another and with respect to said rotatable body such that said first cutting edge is linearly oriented in a transverse direction parallel with an axis of rotation of said cylindrical rotatable body for forward cutting, and said second edge is linearly oriented in a tangential direction with respect to said cylindrical rotatable body for cutting in a radial direction, outwardly from said cylindrical rotatable body.

7. The cutting apparatus of claim 6, wherein said first cutting edge directs wood chips towards said cylindrical rotatable body and toward said second cutting edge for reduction to smaller wood chips.

8. The cutting apparatus of claim 6, wherein said first cutting edge is disposed on a cutting tooth for cutting a first piece of matter from a larger piece of matter, and said second cutting edge is positioned on a splitter for splitting said first piece of matter into smaller pieces of matter.

9. A method of cutting brush, comprising the steps of:
   providing a machine having a generally cylindrical rotating drum with cutting teeth and splitters disposed thereon, wherein at least one tooth includes a first linear cutting edge disposed in a transverse direction parallel with an axis of rotation of said cylindrical rotating drum in order to cut in a tangential direction with respect to a surface of said drum, and at least one said splitter includes a second cutting edge disposed between said first cutting edge and said drum, wherein said second linear cutting edge is positioned tangentially with respect to said cylindrical rotating drum in order to cut in an outward, radial direction with respect to said cylindrical surface of said drum;
   utilizing said first cutting edge to cut a section of matter, providing an angled surface on an underside of said first cutting edge so that said angled surface directs said cut section of matter onto said second cutting edge;
   utilizing the second cutting edge to split the section of matter into smaller pieces of matter, so that said second cutting edge directs the cut section of matter outwardly and around lateral sides of said cutting teeth.

* * * * *